Oct. 18, 1932.

R. C. VAN SICKLE

Re. 18,630

CIRCUIT INTERRUPTER

Original Filed May 19, 1928

WITNESSES:

C. J. Weller.

Paul J. Glaister

INVENTOR

Roswell C. Van Sickle

BY F. W. Lyle

ATTORNEY

Reissued Oct. 18, 1932

Re. 18,630

UNITED STATES PATENT OFFICE

ROSWELL C. VAN SICKLE, OF WILKINSBURG, PENNSYLVANIA, ASSIGNOR TO WESTINGHOUSE ELECTRIC & MANUFACTURING COMPANY, A CORPORATION OF PENNSYLVANIA

CIRCUIT INTERRUPTER

Original No. 1,764,369, dated June 17, 1930, Serial No. 278,938, filed May 19, 1928. Application for reissue filed May 12, 1932. Serial No. 610,963.

My invention relates to circuit interrupters and more particularly to the contact members thereof.

It is well known in the electrical art that a current, when passing through parallel conductors, will produce a flux thereabout that causes the parallel conductors to be drawn toward each other.

It is one object of my invention to provide means associated with a pair of parallel contact fingers that shall act to draw them tightly against the cooperating contact surface to insure a good electrical contact therewith.

It is a further object of my invention to provide contact fingers and a bridging member with which they cooperate with means that will increase the contact pressure in a direct proportion to the amount of current flowing through the circuit.

These and other objects that may be made apparent throughout the further description of my invention are attained by means of the apparatus hereinafter described and illustrated in the accompanying drawing, wherein.

Figure 1:
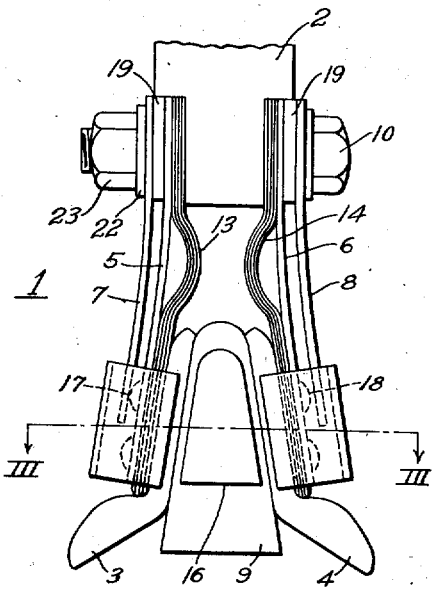
Figure 1 is a view, in elevation, of a particular form of contact member embodying my invention and shown in closed position.
Figure 2:
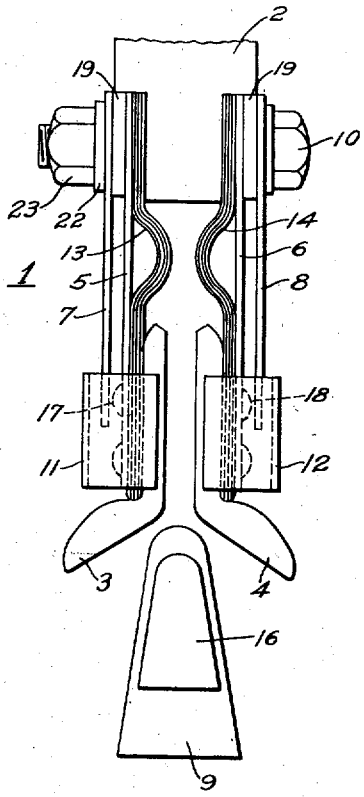
Fig. 2 is a view, similar to Fig. 1 but showing the contact member in open position.
Figure 3:
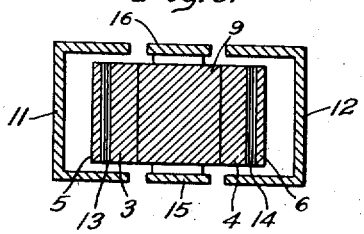
Fig. 3 is a sectional view of the embodiment of my invention shown in Fig. 1, taken along the line III—III.

My invention comprises, in general, a contact member 1 that is supported on the end of a terminal stud 2 and comprises terminal members 3 and 4 that are supported on spring members 5 and 6 bolted to the conductor member 2 by the bolt 10. Spring members 7 and 8 are employed to bias the contact members 3 and 4 against a wedge-shaped conducting member 9 in order to make suitable contact therewith.

When this type of finger is employed on a circuit interrupter designed for heavy currents, increased pressure on the contact member must be provided in order to reduce the potential drop in the junction to a minimum. It is found that, when the spring members 5, 6, 7 and 8 are made larger and heavier in order to increase this contact pressure, the terminals 3 and 4 will lose their flexibility, and poor contact between the abutting surfaces will result. Poor contact is also experienced with terminals of this type when one of the fingers has been bent away from the other because of poor alignment or loose motion in the moving members causing the finger to be stressed beyond its elastic limit.

Many arrangements have been employed to assure good pressure and contact on the surface of such finger-type contacts as are here shown. These structures have, however, all proved costly and ineffective. In accordance with my invention, I employ U-shaped iron members 11 and 12, disposed about the terminal members 3 and 4 and forming a magnetic path for the flux which surrounds the flexible conducting shunts 13 and 14 when the current is flowing therethrough. Iron plates 15 and 16 are fastened to each side of the wedge member 9, and the sides thereof lie parallel to the tapering side of this member. The U-shaped iron members 11 and 12 are so mounted that the side portions thereof have their surfaces parallel to the surface of the terminals 3 and 4.

The air gaps between the U-shaped members 11 and 12 and the iron plates 15 and 16 are of the same width along their entire length because of the parallel arrangement of these iron members. By this arrangement, I obtain the same pressure between the surfaces of the terminal members 3 and 4 and the wedge member 9 when the wedge 9 is completely or only partially forced between the terminal members 3 and 4. The air gap between the iron members remains the same along the entire path of travel of the wedge member 9 so that the same pressure between the latter and terminal members 3, 4 is produced in all of its positions.

When employing my magnetic circuit, the contact member 1 is assembled in the same way as those heretofore employed in the art. The terminal members 3 and 4 are attached to the shunts 13 and 14 and the spring members 5 and 6 by rivets 17 and 18. The magnetic circuits 11 and 12 are next riveted to the contact members 3 and 4, and the whole assembly mounted on the contact member 2 by the bolt 10. The spring members 7 and 8, along with spacers 19 and 19, are also mounted on the bolt member 10 and all are clamped into a solid structure by a washer 22 and nut 23.

I have found that, on a pair of contact members similar to those here shown, having each air gap one-eighth of an inch wide, the force on each finger per square inch of iron cross-section is approximately $1.09\ I^2 \times 10^{-6}$ pounds. It will be evident that, when a greater force is required for a given current, the cross-section of the iron members 11, 12, 15 and 16 may be increased. By such means as will be evident, any pressure may be obtained on the working face of a contact member by properly proportioning the magnetic circuits to the current flowing in the contact.

It will thus be seen that I have provided for an increasing pressure on the terminal of the finger or parallel-path type contact member by employing an iron circuit surrounding the portions of the contact member that abut against cooperating contact member. By locating my iron members so that their adjacent surfaces are parallel to the abutting current-carrying surfaces, the same pressure is obtained for various positions of the bridging member relative to the terminal members. This construction results in causing the contact members to produce a greater pressure on the abutting contact surfaces when a greater current is flowing in the line and this pressure increase is proportional to the increase of current until the magnetic circuit becomes saturated.

My invention is further novel in that it makes possible an increased pressure at the abutting surfaces of the contacts by increasing the cross-sectional area of the said magnetic circuit.

It is to be understood that such changes in the form, arrangement and connection of the component parts of my invention may be made as shall fall within the scope of the appended claims.

I claim as my invention:

1. A parallel-path contact member, a cooperating member therefor and a loop of iron about the contact member and the cooperating member forming a magnetic path about the point of contact between the said members for drawing them into more intimate current-carrying relation.

2. A pair of contact members forming a parallel path for a current to be interrupted a member cooperating therewith and a magnetic circuit formed about said members to draw the current carrying portions into more intimate engagement.

3. The combination with a pair of finger contacts and a wedge-shaped contact member cooperating therewith, of a magnetic circuit formed by iron members associated with the finger contacts and the wedge-shaped member to draw them together when current is passing therethrough.

4. The combination with a pair of finger contacts, of a wedge shaped member passing therebetween, a U-shaped magnetic circuit about each contact member and an iron member on each side of the wedge-shaped member.

5. The combination with a pair of contact members forming parallel paths for an electric current, of a conducting member movable between the fingers to complete a circuit therewith, a U-shaped member of iron about each contact finger and an iron plate on each side of the conducting member aligned with the U-shaped members.

6. In a circuit interrupter, a stationary contact member, a movable switch member cooperating therewith for opening and closing the circuit, and magnetic means energized by the current flowing in said cooperating members for applying contact pressure between said stationary contact member and said switch member, said magnetic means including a member of magnetic material affixed to said movable switch member.

7. In a circuit interrupter, separable contact members for opening and closing the circuit, said contact members having engaging contact faces, and a member of magnetic material energized only when said separable contacts are in the closed position for exerting a force tending to press said contact faces toward each other.

8. In a circuit interrupter, separable contact members for opening and closing the circuit, said contact members having engaging contact faces, and magnetic means energized by the current flow through said separable members for biasing said engaging contact faces toward each other, said magnetic means including a substantially channel shaped member of magnetic material affixed to and disposed about one of said engaging contact members.

9. In a circuit interrupter, separable contact members for opening and closing the circuit, said contact members having engaging contact faces, spring means and magnetic means for biasing said contact faces toward each other, said magnetic means being energized only when said separable contacts are in the closed position, and including a channel shaped member of magnetic material fastened to one of said contact members and a member of magnetic material cooperating therewith, one of said separable contact members being disposed between the legs of said channel shaped member.

10. In a circuit interrupter, a stationary contact member, a supporting means for said contact member, a movable switch member cooperating with said stationary contact member for opening and closing the circuit, said stationary member and said switch member having engaging contact faces, and magnetic means for biasing said contact faces toward each other, said magnetic means being energized only when said circuit interrupter is in the closed position and including a member of magnetic material affixed to said movable switch member and a member of magnetic material affixed to said contact supporting means.

11. In a circuit interrupter, a stationary contact member, a movable switch member cooperating therewith for opening and closing the circuit, said stationary contact member and said movable switch member having engaging contact surfaces, spring means for supplying a predetermined normal contact pressure between said engaging contact surfaces, and magnetic means energized by the current flow through said cooperating members for increasing the normal contact pressure between said engaging contact surfaces, the increase in contact pressure due to the magnetic means being substantially proportional to the magnitude of the energizing current.

12. In a circuit interrupter, a stationary contact member, a supporting means for said contact member, a movable switch member cooperating with said stationary contact member for opening and closing the circuit, said stationary contact member and said movable switch member having engaging contact surfaces, spring means for supplying a predetermined normal contact pressure between said engaging contact surfaces, and magnetic means energized by the current flow through said cooperating members for biasing said contact surfaces toward each other, said magnetic means including a member of magnetic material affixed to said movable switch member and a member of magnetic material affixed to said supporting means.

13. In a circuit interrupter, two separable contact members for opening and closing the circuit, said contact members having engaging contact surfaces, and magnetic means energized by the current flow through said separable members for biasing said engaging surfaces toward each other, said magnetic means comprising a channel shaped member of magnetic material affixed to one of said separable contact members and a cooperating means of magnetic material for attracting said channel shaped member, one of said separable contact members being disposed between the legs of said channel shaped member.

14. In a circuit interrupter, separable contact members for opening and closing the circuit, said contact members having engaging contact faces, spring means and magnetic means for biasing said contact faces toward each other, said magnetic means including a member of magnetic material fastened to one of said contact members and a member of magnetic material cooperating therewith, the magnetic circuit formed by said members of magnetic material having a gap of high reluctance therein when said separable contacts are in the closed position.

15. In a circuit interrupter, two separable contact members for opening and closing the circuit, said contact members having engaging contact surfaces, and magnetic means for biasing said engaging surfaces toward each other, said magnetic means comprising a channel shaped member of magnetic material affixed to one of said separable contact members and a cooperating member of magnetic material for attracting said member of magnetic material, said members of magnetic material being separated from each other at at least one point at all times during the operation of said interrupter, one of said separable contact members being disposed between the legs of said channel shaped member.

16. In a circuit interrupter, a stationary contact member, a supporting means for said contact member, a movable switch member cooperating with said stationary contact member for opening and closing the circuit, said stationary member and said switch member having engaging contact faces, and magnetic means for biasing said contact faces toward each other, said magnetic means including a member of magnetic material affixed to said movable switch member and a member of magnetic material affixed to said contact supporting means, said members of magnetic material being separated from each other at all times at at least one point.

17. In a circuit interrupter, a stationary contact member, a supporting means for said contact member, a movable switch member cooperating with said stationary contact member for opening and closing the circuit, said stationary contact member and said movable switch member having engaging contact surfaces, spring means for supplying a predetermined normal contact pressure between said engaging contact surfaces, and magnetic means energized by the current flow through said cooperating members for supplying an additional force biasing said contact surfaces toward each other, said magnetic means including a member of magnetic material affixed to said movable switch member and a member of magnetic material affixed to said supporting means, said members of magnetic material being separated from each other at all times at at least one point.

ROSWELL C. VAN SICKLE.